United States Patent [19]
Weiler et al.

[11] Patent Number: 5,427,213
[45] Date of Patent: Jun. 27, 1995

[54] BRAKE PAD FOR DISC BRAKES

[75] Inventors: Rolf Weiler, Eppstein; Karl Stoerzel, Dreieich; Rudolf Thiel, Frankfurt am Main; Ludwig Dreilich, Bad Soden; Karl-Friedrich Woersdoerfer, Budenheim; Sang-Cheol Shin, Offenbach; Uwe Bach, Niederhausen-Oberjosbach; Dieter Bieraeugel, Hochheim, all of Germany

[73] Assignee: Alfred Teves GmbH, Germany

[21] Appl. No.: 94,083

[22] PCT Filed: Dec. 4, 1991

[86] PCT No.: PCT/EP91/02310
§ 371 Date: Nov. 5, 1993
§ 102(e) Date: Nov. 5, 1993

[87] PCT Pub. No.: WO92/13210
PCT Pub. Date: Aug. 6, 1992

[30] Foreign Application Priority Data

Jan. 21, 1991 [DE] Germany .............. 41 01 599.1
Jun. 22, 1991 [DE] Germany .............. 41 20 631.2

[51] Int. Cl.⁶ .............................................. F16D 69/00
[52] U.S. Cl. .................. 188/250 E; 188/264 G; 188/250 B
[58] Field of Search ............ 188/73.1, 73.31, 73.35, 188/73.36, 73.37, 73.38, 71.6, 72.6, 250 A, 250 B, 250 F, 250 G, 264 A, 264 G, 258; 411/500, 501

[56] References Cited

U.S. PATENT DOCUMENTS

| | | | |
|---|---|---|---|
| 1,909,256 | 9/1932 | Emmord | 188/250 A |
| 4,513,844 | 4/1985 | Hoffman, Jr. | 188/71.6 |
| 4,603,760 | 8/1986 | Myers | 188/264 G X |
| 4,609,077 | 9/1986 | Nakatsuhara | 188/250 E X |
| 4,745,992 | 5/1988 | Cusa | 188/73.31 X |
| 4,823,921 | 4/1989 | Bosco | 188/250 G |
| 4,836,339 | 6/1989 | Kobayashi et al. | 188/73.1 |
| 4,846,312 | 7/1989 | Sweetmore et al. | 188/73.37 X |

FOREIGN PATENT DOCUMENTS

| | | | |
|---|---|---|---|
| 0224988 | 6/1987 | European Pat. Off. | |
| 9218785 | 10/1992 | European Pat. Off. | 188/73.31 |
| 8533587 U | 1/1986 | Germany . | |
| 9000489 U | 5/1990 | Germany . | |
| 1626014 | 2/1991 | U.S.S.R. | 188/250 A |

*Primary Examiner*—Mark T. Le
*Assistant Examiner*—Lee W. Young
*Attorney, Agent, or Firm*—Dykema Gossett

[57] ABSTRACT

A brake pad for disc brakes is provided in which the brake pad comprises a damping plate attached to the reverse face of a lining carrier plate. The damping plate is attached to the lining carrier plate by way of projections which are molded on the lining carrier plate and extend into corresponding apertures of the damping plate. The external ends of the projections are widened so that the damping plate is pressed against the reverse face of the lining carrier plate.

29 Claims, 4 Drawing Sheets

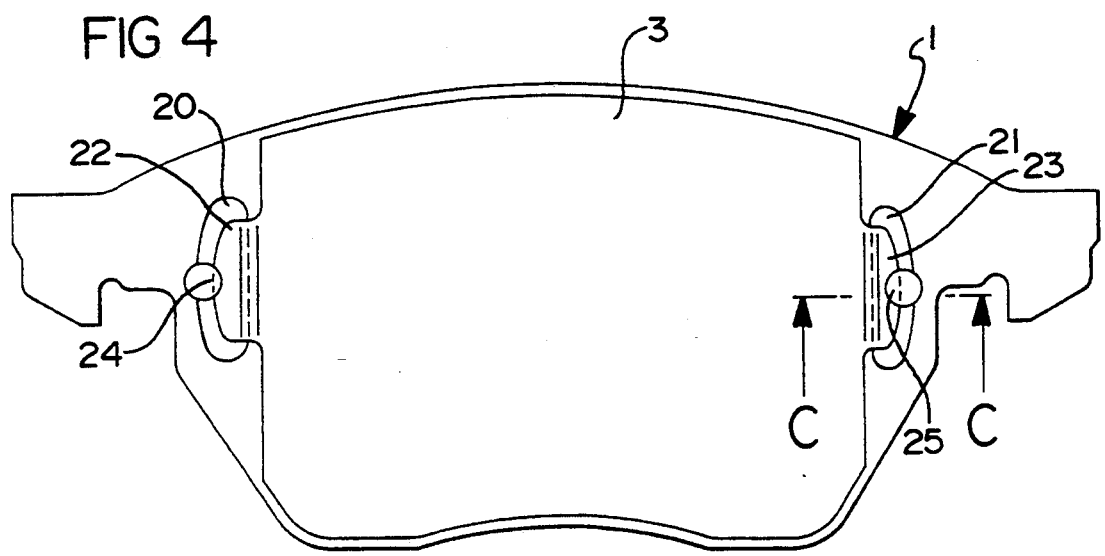
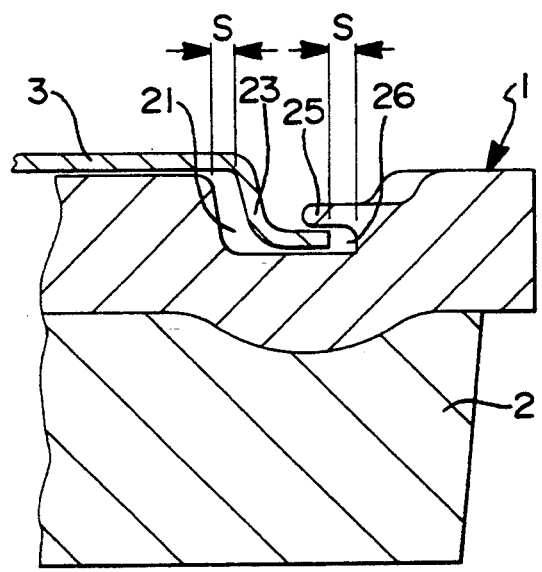

BRAKE PAD FOR DISC BRAKES

BACKGROUND OF THE INVENTION

This invention relates to a brake pad for disc brakes having a damping plate fixed on the reverse face of a lining carrier plate, whereby the damping plate reduces braking noise and provides heat insulation.

It is known in the prior art that braking noises, in particular squealing, can be suppressed by fixing a damping plate to the reverse face of a lining carrier plate of a brake pad. The damping plate is also suited for heat insulation with respect to the hot brake pad of the piston of a hydraulic actuating apparatus being pressed against the reverse face of the lining carrier plate in order to protect the hydraulic fluid from overheating and forming bubbles. Such a damping plate is generally cemented to the reverse face of the lining carrier plate. This form of attachment, however, bears the disadvantage that the damping plate may twist or slip away in the event of heavy strains on the brake.

In a brake pad which is known from U.S. Pat. No. 4,846,312, an anti-twist protection is envisaged. The lining carrier plate is formed with holes which are engaged by correspondingly shaped sections of the damping plate. The damping plate is, however, still retained by cementing. The risk of falling out is not yet excluded in this invention. It is a further disadvantage that additional manufacturing cost is incurred for the configuration of the damping plate and of the lining carrier plate, as well as the cost of cementing.

It is known in the prior art to fix the damping plate to the lining carrier plate by riveting. The riveted couplings, however, have the disadvantage of being very rigid. It has become evident in practice that inaccuracies due to manufacturing techniques or to heat expansion of the damping plate and the lining carrier plate in a hot brake pad lead to buckling-up of the damping plate which then no longer planely abuts the lining carrier plate. This will in turn deteriorate the noise abating properties of the damping plate.

In view of the above-referenced problems associated with braking systems, some attempts have been made to remedy them. For example, EP 0224988 A1 teaches providing slots in the dampening plate so that when rigid rivets are used in the brake assembly, any mechanical stress which is developed is compensated for and damping plate buckling is prevented. Although this approach may be satisfactory in addressing the problems associated with damping plate buckling, this arrangement is not optimal regarding the rigidity and consistency of the damping plate and also regarding the manufacturing effort entailed.

SUMMARY OF THE INVENTION

It is, therefore, an object of this invention to provide a method of attaching the damping plate to the lining carrier plate with improved damping properties while the aforementioned disadvantages of cemented or riveted bonds are avoided.

To achieve this object in accordance with the invention, the attachment consists of a form of riveting by which the damping plate is anchored to the lining carrier plate with space for movement. For this purpose, the lining carrier plate is only deformed at the attachment points.

Preferably, the rivet locations are arranged in consideration of the surface areas of the brake pad. Preferably, the rivet locations are placed such that they do not abut the brake piston or brake caliper during braking. By arranging the rivet locations this way, the rivets are not used to transmit brake clamping forces.

This form of attachment causes a slight increase manufacturing costs. A damping plate which has been anchored in this way can neither twist nor fall out and is, moreover, secured against buckling-up due to the inventive space for movement, so that it will planely abut the lining carrier plate in any condition. No separate element, such as a rivet, is required for attachment.

In one preferred embodiment, the present invention is directed to a brake pad which is directly applied by the brake piston in a floating-caliper spot-type disc brake. In another preferred embodiment, the present invention relates to a disc brake pad which is indirectly applied by a floating-caliper and is arranged on the axial side of the floating-caliper lying opposite the brake piston.

In order to ensure a planar abutment of the damping plate against the reverse face of the lining carrier plate, at least two attachment points should be provided which are disposed in the external marginal range of the lining carrier plate opposite each other. Attachment points in the external marginal range are particularly important because the damping plate is not normally pressed to the lining carrier plate by the piston of the hydraulic actuating apparatus in this area. An additional attachment point may be positioned in the center range of the lining carrier plate. In addition to an improved attachment of the damping plate, a spring could simultaneously be attached at this anchoring point to retain the piston-side brake pad at the piston of the hydraulic actuating apparatus.

Patent protection is also applied for a method of manufacturing the inventive brake pad. The external ends of the projections which serve for attachment are widened, for example, by means of wobble riveting. In this way, the degree of deformation of the external ends can be determined very precisely. During wobble riveting the external ends of the projections are deformed such that they urge the damping plate against the lining carrier plate at an exactly defined pressing force which has been determined to be optimum as to the damping properties for a series of brake pads to be manufactured.

Still in another preferred embodiment of the present invention, a brake pad is disclosed for use in a floating-caliper system such that this brake pad abuts the floating-caliper with ranges that are external in a circumferential direction of the brake disc. Two fixing points are provided in the center range of the brake pad and in the range of a recess of the floating-caliper. Preferably, projections are shaped out of the lining carrier plate for fixing the damping plate to the lining carrier plate. This results in reduced material and reduced manufacturing costs compared to conventional riveting techniques.

In a preferred embodiment of the present invention, the damping plate consists of a steel plate and is coated with rubber.

An advantageous design of this invention is achieved by providing projection depressions on the reverse face of the lining carrier plate. In certain circumstances, a lining carrier plate of this kind may be easier to handle within the framework of an industrial scale manufacturer. The deformations of the lining carrier plate which serve to attach the damping plate must be formed before applying the friction lining. Tongues of the damping plate project laterally and oval depressions of the backplate are disposed parallel to the relevant juxtaposed edge of the damping plate. For low cost manufacture of the depressions and their overhangs it is envisaged to mold them into the lining carrier plate by means of one or of a plurality of dies.

In the manufacture of brake pads of this kind inaccuracies may occur between the distances of the projections of the lining carrier plates provided for attachment and the distances of the holes in the damping plates provided for the passage of said projections which cannot easily be balanced by means of the inventive space for movement. In that case the damping plate of the brake pad will not evenly abut the lining carrier plate, whereby the noise abating properties will be deteriorated.

A further advantageous design of this invention avoids the aforementioned disadvantage by providing oblong holes at the damping plate.

Additional embodiments of the present invention address a brake pad which is positioned on the axial side of the floating caliper furnished with the brake cylinder and which is directly abutted against the brake piston. The two projections of the lining carrier plate are, therefore, positioned in the marginal ranges which in the circumferential direction of the brake disc are situated outside the abutment surface of the brake piston. A retaining spring which serves to retain the brake pad at the brake piston may be attached to a third centered projection. The retaining spring is protected against twisting by having the third centered projection be D-shaped.

For the other brake pad which is positioned on the axial side of the floating caliper opposite the brake piston, a brake pad is recommended wherein the two projections have substantially circular cross sections and are positioned in external marginal ranges of the reverse face of the lining carrier plate. Since the ranges are situated externally in the circumferential direction of the brake disc this brake pad is abutted against the floating caliper, therefore, the two attachment points are provided in the center range of the brake pad and in the range of a recess of the floating caliper.

The projections of the brake pads which are provided for the attachment of the damping plate are molded outward from the lining carrier plate, whereby material expenses and cost of manufacture are saved as opposed to conventional riveting.

BRIEF DESCRIPTION OF THE DRAWINGS

Embodiments of this invention will be described in more detail in the following, making reference to the accompanying drawings, in which:

FIG. 4 is a top view of the inventive brake pad in a second embodiment;

FIG. 5 is a cross-sectional view along the line C—C of FIG. 4;

DETAILED DESCRIPTION OF THE PREFERRED EMBODIMENT

Figure 1:
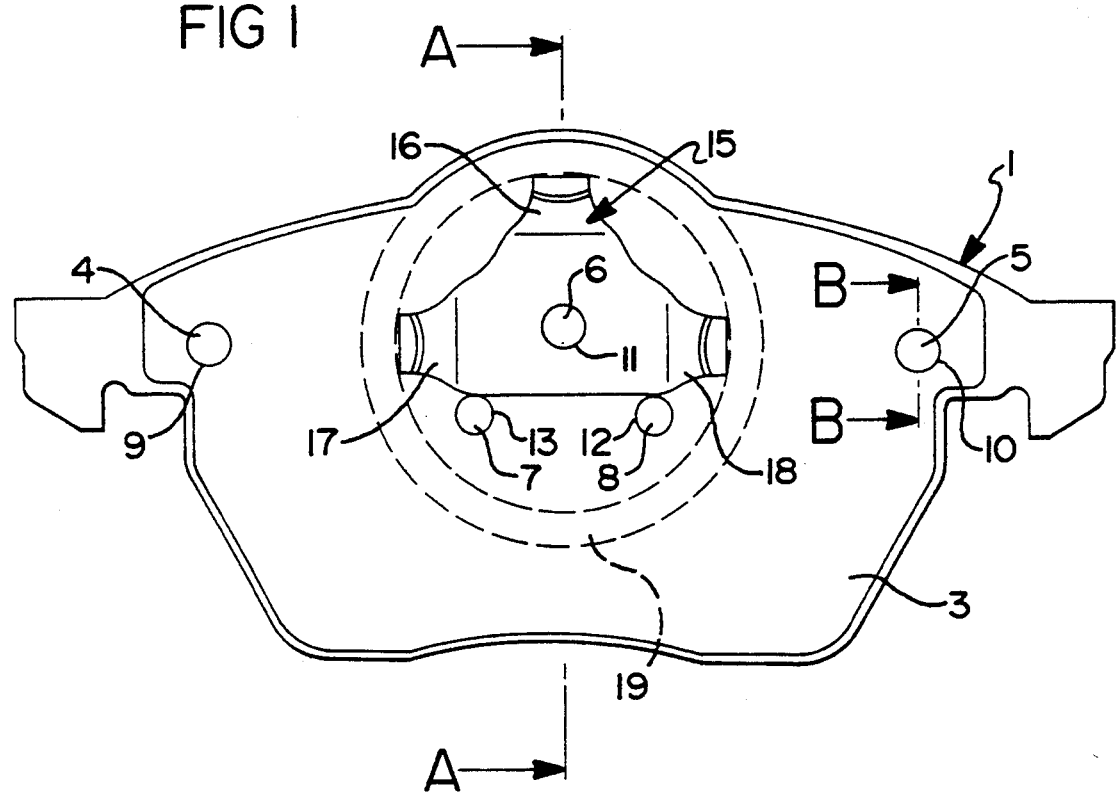
FIG. 1 is a top view of the inventive brake pad in a first embodiment.
Figure 2:
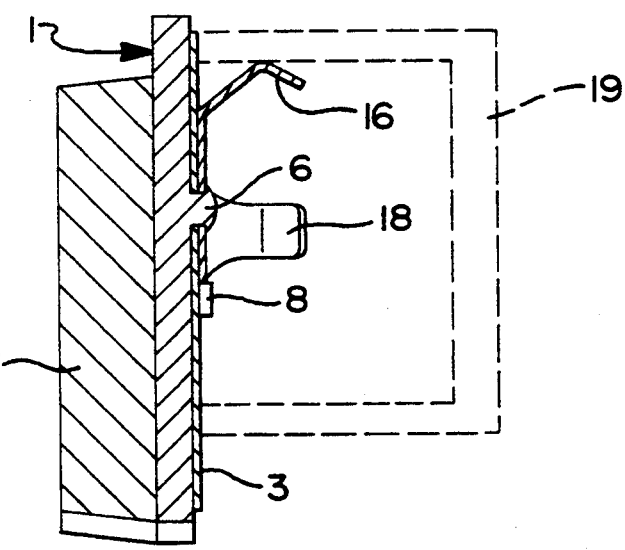
FIG. 2 is a cross-sectional view along the line A—A of FIG. 1.
Figure 3:
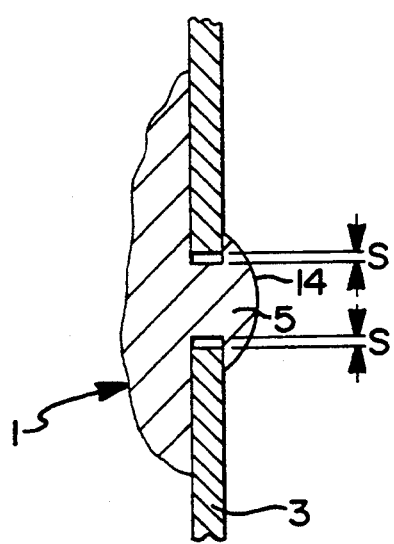
FIG. 3 is a cross-sectional view along the line B—B of FIG. 1.

The brake pad illustrated in FIGS. 1 to 3 is furnished with a lining carrier plate 1 whose front face is secured to a friction lining 2 and whose reverse face is secured to a damping plate 3. The lining carrier plate 1 has five projections 4, 5, 6, 7, 8 molded outwardly from the plane and project through five holes 9, 10, 11, 12, 13 of said damping plate 3. The external ends 14 of said projections 4, 5, 6 are widened by means of a wobble riveting so that they overlap the damping plate 3 at their sides and urge it against the lining carrier plate 1. Between said projections 4, 5, 6, 7, 8 and said damping plate 3 a space for movement s is provided which allows a slight shift of the damping plate 3 with respect to the projections 4, 5, 6, 7, 8 in a direction which is parallel to the plane of the plate. The projection 6 serves, in addition, to secure a retaining spring 15 whose spring arms 16, 17, 18 project outwardly at a substantially right angle to the plane of the lining carrier plate 1 and engage the interior space of a hollow piston 19 of a hydraulic actuating apparatus (not shown In this way the brake pad is anchored to the piston 19. Said piston 19 is outlined in FIGS. 1 and 2 by dashed lines. The two projections 7 and 8 are intended as an anti-twist protection for the retaining spring 15. They do not serve to attach the damping plate 3, therefore, they are not widened at their external ends.

A second embodiment of the invention is illustrated in FIGS. 4 and 5. Two oval depressions 20, 21 are molded on the reverse face of the lining carrier plate 1 by means of a first larger-size die. The damping plate 3 is formed in this embodiment with two laterally projecting tongues 22, 23 which project into said depressions 20, 21. Overhangs 24, 25 are shaped out of the external walls of said depressions 20, 21 by means of a second smaller-size die. Said tongues 22, 23 are secured under said overhangs 24, 25, whereby the damping plate 3 will be pressed against the lining carrier plate 1. Between the tongues 22, 23 and the lateral walls of the depressions 20, 21 a space for movement s is provided which allows a slight shift of the tongues 22, 23 in a direction which is parallel to the plane of the plate.

Figure 6:
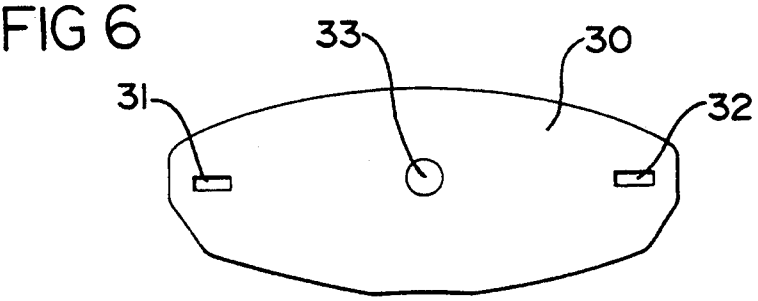
FIG. 6 is a damping plate in a third embodiment.
Figure 7:
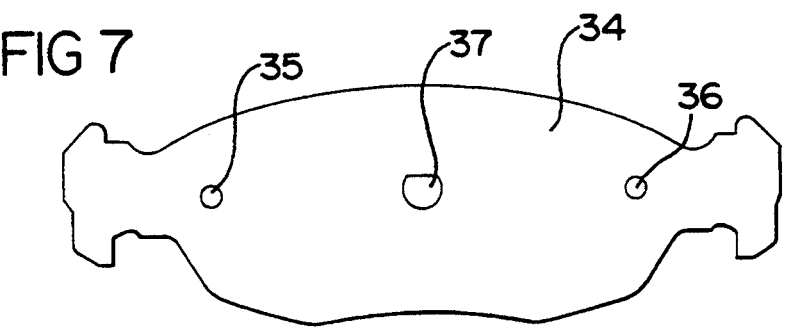
FIG. 7 is a lining carrier plate in a third embodiment.
Figure 8:
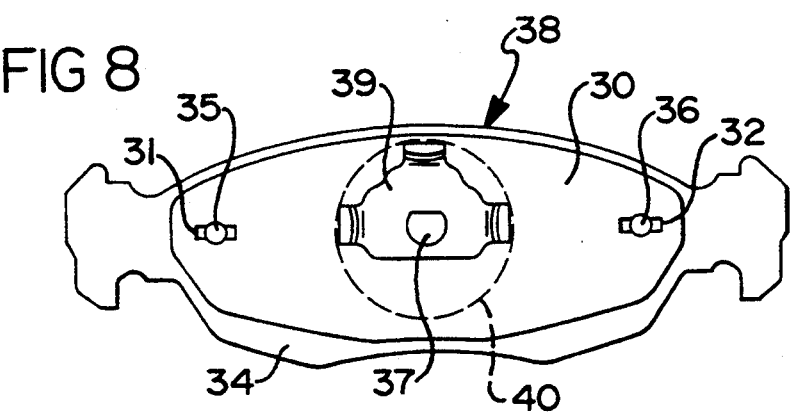
FIG. 8 is a brake pad in a third embodiment.

A third embodiment of the invention is illustrated in FIGS. 6 to 8. A damping plate 30 is furnished with oblong holes 31, 32 which are positioned opposite each other in the external marginal ranges in the circumferential direction of the brake disc (not shown). The longitudinal extension of said two oblong holes 31, 32 runs in the direction of their connecting line. A third, circular hole 33 is provided in the center range of the damping plate 30. In the marginal ranges of its reverse face, as seen in the circumferential direction, a lining carrier plate 34 is furnished with two circular projections 35, 36 and in its center range with a third projection 37 which has a D-shaped cross section.

In the finished brake pad 38 the damping plate 30 is attached to the reverse face of the lining carrier plate 34, the D-shaped projection 37 projects through the third hole 33 and the two circular projections 35, 36 project through the oblong holes 31, 32. Dimensional inaccuracies which are due to the manufacturing techniques will be balanced by said oblong holes 31, 32, so that the damping plate 30 will evenly abut with the lining carrier plate 34 upon riveting of the projections 35, 36. The D-shaped projection 37 projects through an opening of a retaining spring 39 which is also D-shaped. The retaining spring 39 is riveted to the projection 37, whereby it will be secured so as to be protected against twisting.

The brake pad 38 is intended for use in a floating-caliper disc brake, particularly for that axial side which is furnished with a brake piston sliding within the brake cylinder. In this configuration, the retaining spring 39 penetrates into the interior space outlined by a dashed line 40 of the hollow brake piston which is directly abutted against the brake pad 38.

Figure 9:
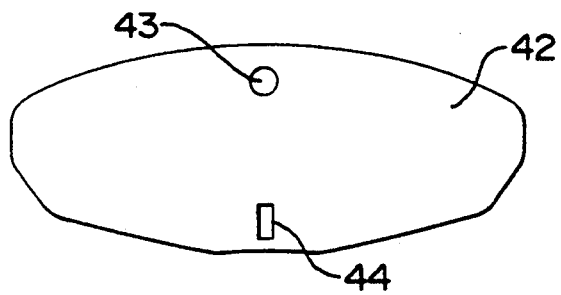
FIG. 9 is a damping plate in a fourth embodiment.
Figure 10:
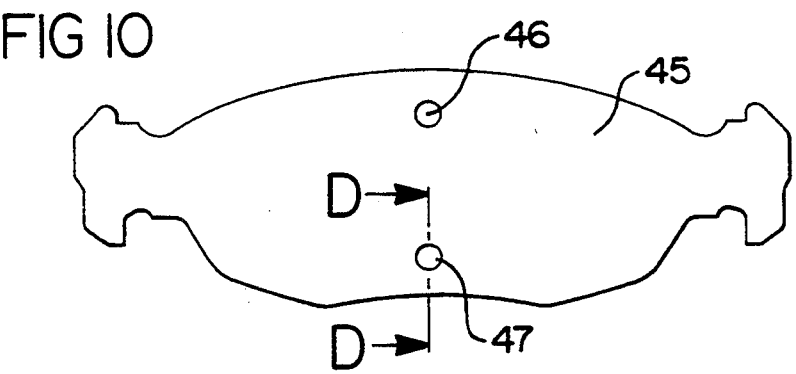
FIG. 10 is a lining carrier plate in a fourth embodiment.
Figure 11:
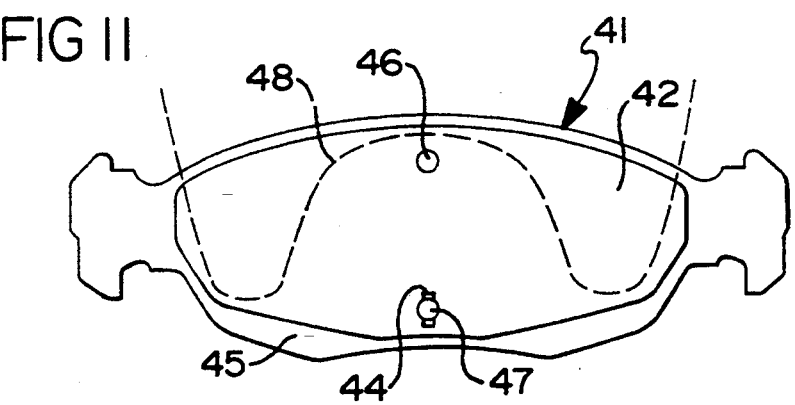
FIG. 11 is a brake pad in a fourth embodiment.

A fourth embodiment illustrated in FIGS. 9 to 11 is related to another brake pad 41 which is intended for use in the same floating-caliper type disc brake, but on the axial side opposite the brake piston.

Here, the damping plate 42 is furnished with a circular hole 43 and with an oblong hole 44. The two holes 43, 44 are disposed in the radial direction of the brake disc (not shown) on either side of the center of the damping plate 42 opposite each other. The lining carrier plate 45 is furnished with two correspondingly positioned circular projections 46, 47 to which the damping plate 42 is riveted. Dimensional inaccuracies are balanced by the oblong hole 44, whereby a planar abutment of the damping plate 42 is obtained.

In the assembled condition, the brake pad 41 is abutted to the floating caliper as illustrated by dashed line 48. In this configuration, two fingers of the floating caliper extend over the reverse of the brake pad 41 and over the damping plate 42. The projections 46, 47 are arranged such that they are positioned in a recess of the floating caliper between the fingers, whereby they do not interfere with the floating caliper.

Figure 12:
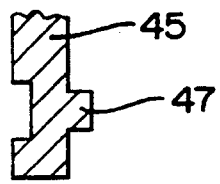
FIG. 12 is a cross-sectional view along the line D—D of FIG. 10.

The projections 35, 36, 37, 46, 47, which serve to attach the damping plates 30, 42 and the retaining spring 39, are molded outwardly from the lining carrier plates 34, 45 as is illustrated in FIG. 12.

It will be apparent to those skilled in the art that the foregoing disclosure is exemplary in nature rather than limiting, the invention being limited only by the appended claims.

What is claimed is:

1. A brake pad for a disc brake, comprising:
   a lining carrier plate which is provided on its front face with a friction lining for urging against a brake disc and on whose reverse face a damping plate is fixed which serves for noise abatement and for heat insulation,
   wherein said lining carrier plate includes at least two projections extending from said reverse face of said lining carrier plate which are disposed at a distance from each other,
   means for permitting movement during use between said damping plate and said lining carrier plate, said means including apertures within said damping plate, each aperture respectively associated with one of said projections, each said aperture allowing a space for movement between said aperture and said respectively associated projection,
   wherein the external ends of said projections are widened so that they project over the edges of the respectively associated aperture and press said damping plate against said lining carrier plate, thereby allowing a slight lateral shift of said damping plate relative to said lining carrier plate in a direction parallel to the plane of said lining carrier plate within the limits of said space for movement.

2. A brake pad as claimed in claim 1, wherein said at least two projections are disposed in an external marginal range of said lining carrier plate opposite each other.

3. A brake pad as claimed in claim 2, wherein a third projection is provided in a center range of said lining carrier plate whereby said third projection serves to secure a retaining spring to said brake pad.

4. A brake pad as claimed in claim 1, wherein widened external ends of said projections of said lining carier plate are widened by means of wobble riveting.

5. A brake pad as claimed in claim 4, wherein said wobble riveting generates a force which is optimum as to the damping properties for a series of brake pads to be manufactured.

6. A brake pad as claimed in claim 4, wherein said wobble riveting creates a shape of said widened external end of said projections which is optimum as to the damping properties for a series of brake pads to be manufactured.

7. A brake pad as claimed in claim 1, wherein said damping plate comprises a steel plate coated with rubber.

8. A brake pad for a disc brake, with a lining carrier plate which is provided on its front face with a friction lining being intended to be urged against a brake disc and on whose reverse face a damping plate is fixed which serves for noise abatement and/or for heat insulation, comprising:
   at least two projections extending from said reverse face of said lining carrier plate which are disposed at a distance from each other and which extend into at least two corresponding apertures of said damping plate, at least one of said apertures is oblong in shape and longitudinal extension of said oblong aperture extends in the direction of the connecting line between said at least two apertures, said damping plate is attached to said lining carrier plate by riveting of said at least two projections of said lining carrier plate to said damping plate.

9. A brake pad as claimed in claim 8, wherein said at least two projections have substantially circular cross sections and are positioned in an external marginal ranges of said reverse face of said lining carrier plate, and said at least two projections being disposed substantially opposite each other in the circumferential direction of said brake disc.

10. A brake pad as claimed in claim 9, wherein a third projection is positioned in a center range of said lining carrier plate and projects through a third aperture of said damping plate and by which a retaining spring of spring sheet steel is riveted to said brake pad.

11. A brake pad as claimed in claim 10, wherein said third projection has a D-shaped cross section and projects through a D-shaped aperture of said retaining spring.

12. A brake pad as claimed in claim 8, wherein said at least two projections have substantially circular cross sections and are positioned in external marginal ranges of said reverse face of said lining carrier plate, and said at least two projections being disposed opposite each other in the radial direction of said brake disc on either side off the center of said brake pad.

13. A brake pad as claimed in claim 8, wherein said at least two projections are molded outwardly from said lining carrier plate.

14. A brake pad for a disc brake, comprising:
a lining carrier plate,
a damping plate, and
damping plate attaching means, said lining carrier plate having a front face for attaching to a brake lining and a reverse face, said damping plate attaching means connected between said lining carrier plate and said damping plate for loosely coupling said damping plate to said reverse face of said lining carrier plate so that relative movement is permitted during use between said lining carrier plate and said damping plate.

15. A brake pad as claimed in claim 14, wherein said damping plate comprises a steel plate coated with rubber.

16. A brake pad as claimed in claim 14, wherein said damping plate attaching means includes at least two projections extending from said reverse face of said lining carrier plates said projections having a narrow portion and a widened portion; and at least two apertures made in said damping plate to respectively engage said projections.

17. A brake pad as claimed in claim 16, wherein said widened portion of said projections of said lining carrier plate is formed by wobble riveting.

18. A brake pad as claimed in claim 14, wherein at least one of said apertures is oblong in shape and longitudinally extends in the direction of the connecting line between said at least two apertures.

19. A brake pad as claimed in claim 16, wherein said lining carrier plate is attached to said damping plate by way of riveting.

20. A brake pad for a disc brake, comprising:
a lining carrier plate, said lining carrier plate having a front face and a reverse face, said reverse face including at least two projections extending therefrom at a distance from each other, and said projections having a narrow portion and a widened portion;
a damping plate, said damping plate having at least two apertures, said apertures corresponding to said projections of said lining carrier plate, and said apertures having a diameter larger than diameter of said narrow portion of said projection of said lining carrier plate, and said diameter also being smaller than diameter of said widened portion of said projection of said lining carrier plate thereby creating a space for movement between said damping plate and said lining carrier plate;
whereby said widened portion of projections of said lining carrier plate extend beyond diameter of said apertures of said damping plate and press said damping plate against said lining carrier plate so that a slight lateral shift of said damping plate relative to said lining carrier plate in a direction parallel to the plane of said lining carrier plate is possible within the limits of the space for movement.

21. A brake pad as claimed in claim 20, wherein said damping plate comprises a steel plate coated with rubber.

22. A brake pad as claimed in claim 20, wherein said widened portion of said projections of said lining carrier plate is formed by wobble riveting.

23. A brake pad assembly for a disc brake, comprising:
a lining carrier plate, a friction lining, and a damping plate, said lining carrier plate having first and second sides and also having two spaced projections;
said friction lining attached to said first side of said lining carrier plate for urging against a brake disc;
said damping plate including first and second openings adapted to respectively engage said first and second spaced projections for attaching said damping plate to said second side of said lining carrier plate;
said two projections being positioned on said lining carrier plate in a location spaced from a region generally intended to transmit clamping forces to said brake disc;
wherein, at least one of said first and second openings is elongated relative to its respectively associated projection, wherein said elongation is generally in the direction of a connecting line drawn between said two projections, whereby a pressure force generated by attacking permits a slight parallel shift of the damping plate in relation to the lining carrier plate.

24. The brake pad assembly of claim 23, wherein said two projections include a substantially circular cross-section and are arranged in the external marginal ranges of the lining carrier plate in the circumferential direction of the brake disc opposite each other.

25. The brake pad assembly of claim 24, wherein the lining carrier plate includes a third projection and wherein said assembly further includes a retaining spring, wherein said third projection is positioned in a central range of the lining carrier plate and projects through a third hole in the damping plate, said third projection attaching said retaining spring to said assembly.

26. The brake pad assembly of claim 25, wherein said third projection includes a generally D-shaped cross-section and projects through a D-shaped opening in said retaining spring.

27. The brake pad assembly of claim 23, wherein said two spaced projections have substantially circular cross-sectional areas and are arranged opposite each other on opposite sides of the brake pad in external marginal ranges of the lining carrier plate along a radial direction of the brake disc.

28. The brake pad assembly of claim 23, wherein said two spaced projections are shaped from the material comprising the lining carrier plate.

29. The brake pad assembly of claim 23, wherein said damping plate consists of a steel plate coated with rubber.

* * * * *

UNITED STATES PATENT AND TRADEMARK OFFICE
CERTIFICATE OF CORRECTION

PATENT NO.   : 5,427,213
DATED        : June 27, 1995
INVENTOR(S)  : Weiler et al It is certified that error appears in the above-indentified patent and that said Letters Patent is hereby corrected as shown below:

In claim 23, column 8, line 28, please delete "attacking" and insert --attaching--.

Signed and Sealed this

Thirtieth Day of April, 1996

Attest:

BRUCE LEHMAN

*Attesting Officer*           Commissioner of Patents and Trademarks